United States Patent [19]

Blum

[11] Patent Number: 5,338,786

[45] Date of Patent: Aug. 16, 1994

[54] STABILIZED URETHANE BASED SURFACE COATING

[76] Inventor: Holger Blum, Parkallee 75, D-2000 Hamburg 13, Fed. Rep. of Germany

[21] Appl. No.: 18,703

[22] Filed: Feb. 17, 1993

[30] Foreign Application Priority Data

Apr. 15, 1992 [EP] European Pat. Off. ........ 92106475.4

[51] Int. Cl.$^5$ ........................................... C08K 5/3477
[52] U.S. Cl. ...................... 524/83; 524/169; 524/171; 524/442; 524/720; 524/723
[58] Field of Search ................. 524/83, 169, 171, 442, 524/720, 723

[56] References Cited

U.S. PATENT DOCUMENTS

| 3,214,397 | 10/1965 | Cox | 524/83 |
| 3,527,800 | 9/1970 | Sayigh | 524/169 |
| 3,683,045 | 8/1972 | Baldwin | 524/83 |
| 3,931,060 | 1/1976 | Schubart et al. | 524/83 |
| 4,383,070 | 5/1983 | Markusch et al. | 524/317 |

FOREIGN PATENT DOCUMENTS 0275893 7/1988 European Pat. Off. .
1245590 2/1968 Fed. Rep. of Germany .
1900513 8/1970 Fed. Rep. of Germany .
2030316 12/1970 Fed. Rep. of Germany .

OTHER PUBLICATIONS

Doyle, E. N., "The Development and Use of Polyurethane Products", New York, p. 77 et seq. (1971).
Bienemann, R. A., et al., Off. Digest 32, 273 (1960).
Sanders, J. H., "Polyurethane Chemistry and Technology", New York 2:533 (1964).

Primary Examiner—Kriellion S. Morgan
Attorney, Agent, or Firm—Fisher & Associates

[57] ABSTRACT

An improved urethane pre-polymer-based surface coating comprising a mineral filler the improvement comprising a thiophene compound and arylsulphorylisocyanate compound. A method of delaying or preventing the cross-linking or gelation of a urethane pre-polymer-based surface coating prepared with a mineral filler, comprises adding to of the formulation the surface coating a thiophene compound and an arylsulphonylisocyanate compound in amounts effective to prevent or delay the cross-linking or gelation of the surface coating.

20 Claims, No Drawings

STABILIZED URETHANE BASED SURFACE COATING

This application is based on European Patent No. 92106475.4 the entire contents of which are incorporated herein by reference.

BACKGROUND OF THE INVENTION

1. Field of the Invention

This invention relates to an improved mineral-filled urethane pre-polymer-based surface coating comprising free isocyanate groups that incorporates thiophene and arylsulphonylisocyanate compounds. This improved composition delays or prevents cross-linking or gelation of the surface coating during storage.

2. Description of the Background

Surface coatings are known that are based on the cross-linking of urethane pre-polymers with free isocyanate groups. These surface coatings may be compounded to include mineral components which enhance the durability and binding of the urethane coatings. However, the inclusion of these minerals accelerates the cross-linking and gelation of the surface coatings during storage. This is particularly pronounced when silicate fillers are present. Urethane pre-polymers rapidly cross-link under storage conditions even in the absence of moisture. This cross-linking leads to a progressive increase in viscosity that culminates in the gelation of the surface coating. In addition, the catalytic trimerization of the free isocyanate groups also contributes to the instability of silicate filled urethane coatings as is known to those skilled in the art. (Doyle, E.N., "The Development and Use of Polyurethane Products", New York, page 77 et seq. (1971)).

Other methods are known to reduce the reactivity of pigments utilized in coating compositions. In one method, the pigment is pre-treated with a pure isocyanate in a solvent so that all reactive groups found in the pigment are pre-reacted with the isocyanate. This protective step is conducted before adding of the urethane pre-polymer comprising terminal isocyanate groups. This prior art method, however, requires the addition of a solvent and is technically complex. (Bienemann, R. A., et al., Off. Digest 32:273 (1960); Saunders, J. H., "Polyurethane Chemistry and Technology", New York 2:533 (1964)).

DE-A-1900513, DE-A-2030316, DE-C-1245590, US-A-4383070 and EP-A-0275893 disclose methods for stabilizing preparations containing urethane pre-polymers monoisocyanates and, optionally, reactive fillers which would otherwise cross-link in the presence of moisture.

Another known way of stabilizing surface coatings which contain urethane pre-polymers comprising terminal isocyanate groups is by dissolving the pre-polymers in dimethyl formamide and adding 0.01% to 2% by weight of an ammonium salt of an organic acid as stabilizer.

Another method of stabilizing urethane pre-polymers in the presence of silicate fillers requires that the free isocyanate content of the preparation be above approximately 2.4%. When the isocyanate content is kept at this amount the storage time is extended to at least 12 months at room temperature.

Moreover, many solvent-based formulations are ineffective, because the urethane polymers geld when the solvents are evaporated in high vacuum.

Accordingly, there is still a need for an effective formulation of a mineral-filled, urethane pre-polymer-based surface coating that avoid cross-linking or gelation of the pre-polymers prior to use and have prolonged storage periods.

SUMMARY OF THE INVENTION

This invention relates to an improved mineral-containing surface coating based on urethane pre-polymers comprising free isocyanate groups, stabilizated against cross-linking and gelation that comprises (a) a thiophene of the chemical formula

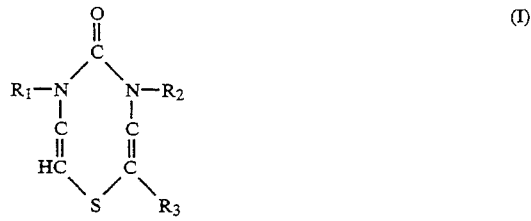

wherein $R^1$ and $R^2$ are, independent from one another, ($C_1$–$C_8$)acyl; and $R^3$ is ($C_1$–$C_{12}$)acyl, ($C_1$–$C_8$)alkyl or ($C_6$–$C_{12}$)aryl group substituted with halogen, $NO_2$, CN, alkoxy or carbonyloxyalkyl, the substituent being non-reactive with components of the surface coating; and (b) an arylsulphonylisocyanate of the chemical formula

wherein $R^4$ is ($C_6$–$C_{12}$)aryl or ($C_6$–$C_{12}$)aryl substituted with at least one substituent, the aryl substituent being non-reactive with components of the surface coating.

This invention also relates to a method of preventing the cross-linking or gelation of a urethane pre-polymer coating surface comprising a mineral filler, the method comprising adding to a urethane pre-polymer coating (a) a thiopene compound of the chemical formula

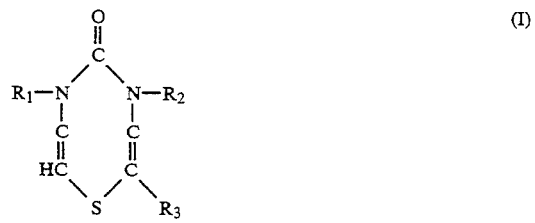

wherein $R^1$ and $R^2$ are, independent from one another, ($C_1$–$C_8$)acyl; and $R^3$ is ($C_1$–$C_{12}$)acyl, ($C_1$–$C_8$)alkyl and ($C_6$–$C_{12}$)aryl, substituted with halogen, $NO_2$, CN, alkoxy or carbonyloxyalkyl, the substituent being non-reactive with components of the surface coating; and (b) an arylsulphonylisocyanate compound of the chemical formula

wherein $R^4$ is ($C_6$–$C_{12}$)aryl substituted with at least one halogen, alkyl or alkoxy, the aryl substituent being non-reactive with components of the surface coating.

Other objects, advantages and features of the present invention will become apparent to those skilled in the art from the following discussion.

DESCRIPTION OF THE PREFERRED EMBODIMENTS

This invention arose from a desire of the inventor to provide improved surface coatings, based on urethane pre-polymers comprising free isocyanate groups stable to storage when formulated with mineral fillers. Thus, hereby, the present inventor provides a surface coating with improved stability to changes in viscosity during storage in the absence of moisture.

The inventor has formulated an improved mineral-containing, urethane pre-polymer-based surface coating having an enhanced storage period. The present product affords a minimal viscosity increase which would lead to gelation. The improvement comprises a formulation, comprising in addition to the urethane pre-polymer comprising free isocyanate groups a thiophene compound of the chemical formula

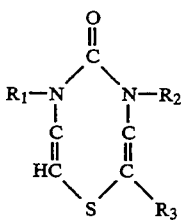
(I)

wherein $R^1$ and $R^2$ are $(C_1-C_8)$acyl, and $R^3$ is $(C_1-C_{12})$acyl, $(C_1-C_8)$alkyl and $(C_6-C_{12})$aryl substituted with halogen, $NO_2$, CN, alkoxy or carboxyalkyl, the substituent being non-reactive with components of the surface coating; and an arylsulphonylisocyanate compound of the formula $$R^4-SO_2-N=C=O \quad (II)$$

wherein $R^4$ is mononuclear or binuclear $(C_6-C_{12})$, unsubstituted or substituted with at least one halogen, alkyl, or alkoxy, the aryl substituent being non-reactive with components of the surface coating.

The stabilized surface coating prepared in accordance with the present invention is particularly effective as a formulation having concentrations of free isocyanate groups of from 0.2 to 1.4 wt. %, containing a silicate-based mineral filler of the following formula $$\{Me_2{}^+O\}_v\{Me_2{}^{3+}O_3\}_w\{Me^{2+}O\}_x\{Si\text{-}O_2\}_y\{H_2O\}_z \quad (III)$$

wherein $Me^+$ means at least one monovalent metal, e.g. $Na^+$ or $K^+$, $Me^{2+}$ means at least one bivalent metal, e.g. $Ca^{2+}$ or $Mg^{2+}$, $Me^{3+}$ means at least one trivalent metal, e.g. $Al^{3+}$ or $Fe^{3+}$, v is about 0.1 to 1, w is about 0.2 to 5, x is about 0.1 to 8, y is about 10 to 11 and z is about 2 to 8.

In the thiophene compound of formula I, $R^1$ and $R^2$ are preferably identical and represent acetyl or another common acyl group. $R^3$ is preferably a $(C_1-C_{12})$hydrocarbon residue, which may be substituted one or more times. Suitable substituents are non-reactive with the surface coating. Examples are halogens, $NO_2$, CN, alkyl, alkoxyl and carbonyloxyalkyl groups. $R^3$ is preferably acyl or alkyl substituted with $(C_1-C_8)$carbonyloxyalkyl.

The arylsulphonylisocyanate compound used according to the invention has the chemical formula $$R^4-SO_2-N=C=O \quad (II)$$

wherein $R^4$ is mononuclear or binuclear $(C_6-C_{12})$aryl, substituted by one or more substituents non-reactive with the surface coating. Examples of substituents are halogen $NO_2$, CN, alkyl or alkoxy. However, others are possible. Particularly preferred are phenyl-, p-tolyl-, p-cumyl- or naphthyl-sulphonylisocyanate. The preparation of these compounds is known from DE-C-1289526.

The surface coating in accordance with the present invention preferably contains the thiophene derivative of formula I in an amount of 0.01 to 1.0 wt. %, preferably 0.1 to 0.3 wt. % of the pre-polymer. The arylsulphonyl isocyanate is preferably added in an amount of 0.1 to 1.0 wt. %, and more preferably 0.1 to 0.5 wt. %, of the pre-polymer.

The surface coating in accordance with the invention described herein may be kept in sealed containers for extended periods, e.g., at least 12 months, at room temperature and sealed against humidity. Gelation does not occur within this period to the formulations of this invention. The preparations showed excellent shelf life due to the synergistic effect of the stabilizing composition disclosed herein. This degree of stabilization could not be obtained with previously known preparations.

The urethane pre-polymers comprising terminal isocyanate groups used in the present surface coatings comprise reaction products of polyols, derived from polyesters, polyethers or polybutadienes with diisocyanates of the chemical formula $$O=C=N-R_5-N=C=O \quad (IV)$$

wherein $R^5$ is a common mononuclear or binuclear aromatic, aliphatic or alicyclic hydrocarbon, which may be substituted by alkyl, alkoxy or halogen. The urethane pre-polymers utilized herein may be prepared with stoichiometric ratios of reactive polyol/hydroxyl groups: isocyanate groups of about 1.05 to 1.5. Under these conditions liquid, moderately viscous urethane prepolymers are obtained.

The thiophene compounds on which the above-named formula I is based may be prepared in accordance with US-A-4894463.

The stabilized surface coatings in accordance with the present invention comprise the following four components.

a) Urethane pre-polymers comprising terminal isocyanate groups.
b) Thiophene compounds of the chemical formula I.
c) Arylsulphonylisocyanate compounds of the chemical formula II.
d) Mineral fillers, in particular silicate fillers of the common formula III.

In addition to the above, components known in the art such as anti-oxidants, reaction accelerators, plasticizers, flame-proof retarding agents, and the like, may also be included in the present formulation.

Having now generally described this invention the same will be better understood by reference to certain specific examples, which are included herein for purposes of illustration only, and are not intended to be limiting of the invention or any embodiment thereof, unless so specified.

EXAMPLES

Example 1

Stability of Formulated Surface Coatings

Various preparations of mineral-containing, urethane prepolymer-based surface coatings were formulated with and without thiophene compounds and arylsulphonylisocyanate compounds as described below.

The stability of the prepared surface coatings was measured determining gelation according to the following method. 70 ml of the formulated surface coating together with a teflonized magnetic stirrer was placed in a 110 ml glass bottle equipped with a cap having a humidity-proof seal. The bottle was nitrogen-filled, sealed and stored at room temperature.

After 30 days the sample bottles were inverted and the extent of gelation was determined by measuring the movement of the teflonized magnetic stirrer. A Hallfeld magnetic sensor was used to measure the movement of the teflonized magnetic stirrer under gravity. If the magnetic stirrer moved in the sample, the sample bottle was stored for another period of 30 days. The samples were re-examined periodically until gelation occurred.

Preparations in which the teflonized magnetic stirrer did not move were considered gelled. At this point, the storage test was discontinued and the sample bottle was opened and further examined for gelation.

Triplicate bottles of each surface coating formulation were prepared. The effective storage period to gelation was taken as the period from filling until gelation of the second of three sample bottles of a preparation.

Example 2

Preparation A

A pre-polymer having terminal isocyanate groups was prepared by reacting 7 mols of 2,4-toluylene diisocyanate 80/20 with 1 mol of polyoxypropylene triol (OH number 40.3) and 3 mols of polyoxypropylene diol (OH number 55.1) at a reaction temperature of less than 70° C.

100 parts by weight of the pre-polymer comprising terminal isocyanate groups were mixed with 0.5 parts by weight of phenolic antioxidant, 1 part by weight of dibutyl tindilaurate (reaction accelerator) and 0.8 parts by weight of p-cymylsulphonylisocyanate. Subsequently diisooctyladipate (plasticizer) and talcum were admixed with stirring at a pigment volume concentration (PVC) of talcum of 10%. The content of free isocyanate groups of the converted toluylene diisocyanate was 1.0% by weight of the total preparation.

The silicate filler, talcum, had a residual moisture of 0.06% (xylol method) and a chemical composition as follows.

$SiO_2$: 59.15%
CaO: 0.15%
$Al_2O_3$: 0.26%
MgO: 31.34%
$Fe_2O_3$: 3.36%
$CO_2$: 1.76%
$H_2O$ (of ignition loss): 5.4%.

Example 3

Preparation B 100 parts by weight of the preceding preparation A were mixed with 0.25 parts by weight of 1,2-diacetyl-4-(4-ethoxycarbonylbutanoyl)-1H,3H-thieno[3,4-d]imidazol-2-one.

Example 4

Preparation C

Preparation A was formulated without p-cumylsulphonyl isocyanate. 100 parts by weight of the prepolymer preparation were mixed with 0.4 parts by weight of thiophene derivative of 1,2-diacetyl-4-(4-ethoxycarbonylbutanoyl)-1H,3H-thieno[3,4-d]imidazol-2-one.

Example 5

Preparation D

A pre-polymer comprising terminal isocyanate was prepared by reacting 15 mols of isophorone diisocyanate with 2 mols of polybutadiendiol of functionality 2.5 (OH number 45.2) and 8 mols of polyoxypropylene diol (OH number 55.1) at a reaction temperature of less than 70° C. 100 parts by weight of this prepolymer preparation were mixed with 0.4 parts by weight of Irganox$^R$ 1076 (antioxidant), 0.8 parts by weight of p-toluolsulphonylisocyanate. Subsequently diisoctylphthalate (plasticizer) and kaoline were admixed with stirring in amounts such that the pigment volume concentration (PVC) of kaoline was 10% and the content of free isocyanate groups from the converted isophoron diisocyanate was 0.9% by weight of the total preparation.

The silicate filler, kaoline, had a residual moisture of 0.04% (xylol method) and a chemical composition as follows:

$SiO_2$: 47.40%
CaO: 0.05%
$Al_2O_3$: 38.0%
MgO: 0.41%
$Fe_2O_3$: 0.59%
$K_2O$: 1.26%
$H_2O$ (of ignition loss): 11%

Example 6

Preparation E 100 parts by weight of the preceding preparation D were mixed with 0.25 parts by weight of 1,2-diacetyl-4-(4-ethoxycarbonylbutanoyl)-1H,3H-thieno[3,4-d]imidazol-2-one.

Example 7

Preparation F 100 parts by weight of the preceding preparation D were mixed with 0.20 parts by weight of 1,2-diacetyl-4-ethyl-1H,3H-thieno-[3,4d]imidazol-2-one.

Example 8

Preparation G

Preparation G corresponds to that of preparation D without p-toluolsulphonylisocyanate.

Example 9

Preparation H

A pre-polymer with terminal isocyanate was prepared by prereacting 8 mols of 2,4-toluylene diisocyanate 80/20 with 1 mol of polyoxypropylene triol (OH number 40.3) and 4 mols of polydiglycoladipinate (OH number 58.2) at a reaction temperature of less than 70° C.

100 parts by weight of the above pre-polymer mixture were mixed with 0.5 parts by weight of a phenolic antioxidant, 0.5 parts by weight of dibutyl tindilaurate (reaction accelerator) and 0.8 parts by weight of p-toluolsulphonyl isocyanate. Subsequently dipropylene glycoldibenzoate (plasticizer) and mica powder were admixed with stirring such that the pigment volume concentration (PVC) of mica was 10% and the content of free isocyanate groups from the converted toluylene diisocyanate was 0.7% by weight of the total preparation.

The silicate filler, mica, had a residual moisture of 0.05% (xylol method) and a chemical composition as follows:

$SiO_2$: 48.30%
CaO: 1.25%
$Na_2O$: 1.20%
$Al_2O_3$: 31.55%
MgO: 1.99%
$TiO_2$: 1.04%
$Fe_2O_3$: 2.36%
$K_2O$: 7.86%
$H_2O$ (of ignition loss): 4.2%

Example 10

Preparation I 100 parts by weight of the preceding preparation H were mixed with 0.10 parts by weight of 1,2-diacetyl-4-(4-ethoxycarbonylbutanoyl)-1H,3H-thieno[3,4-d]imidazol-2-one.

Example 11

Preparation K

This composition corresponds to that of preparation H without p-toluolsulphonyl isocyanate.

Surface coatings of preparations B, E, F and I demonstrated gelation-free periods of greater than 12 months. Other preparations without thiophene or arylsulphonylisocyanate compounds had gelation-free periods of 7 months or less and were deemed to have inadequate shelf life. This can be seen from the following Table 1 below.

TABLE 1

| Storage Period for Surface Coating Formulations | | |
| --- | --- | --- |
| Preparation | Shelf Life in Months | Remarks |
| A | 6 | |
| B | 16 | Invention |
| C | 7 | |
| D | 5 | |
| E | 15 | Invention |
| F | 14 | Invention |
| G | 2 | |
| H | 6 | |
| I | 12 | Invention |
| K | 3 | |

Example 12

Preparation of a Control Formulation 100 g mica powder were suspended in 400 ml dry toluol and stirred under nitrogen for 3 days with 6 g phenyl isocyanate at a temperature under 40° C. Thereafter, the suspension was washed with toluol on a pressure filter until phenyl isocyanate could no longer be found in the outflow. 160 g toluol-moist mica powder nitrogen under were prepared by this method.

The silicate filler, mica, had a residual moisture of 0.05% (xylol method) and the chemical composition indicated in Table 2 below.

TABLE 2

| Composition of Mica | | | | | | | |
| --- | --- | --- | --- | --- | --- | --- | --- |
| $SiO_2$: | 48.30% | $Al_2O_3$: | 31.55% | $Fe_2O_3$: | 2.36% | | |
| CaO: | 1.25% | MgO: | 1.99% | $K_2O$: | 7.86% | | |
| $Na_2O$: | 1.20% | $TiO_2$: | 1.04% | | | | |
| $H_2O$: | 4.2%. | | | | | | |
| (of Ignition Loss) | | | | | | | |

A pre-polymer comprising terminal isocyanate was prepared by pre-reacting 7 mols of 2,4-toluylene diisocyanate 80/20 with 1 mol of polyoxypropylene triol (OH number 40.3) and 3 mols of polyoxypropylene diol (OH number 55.1) at a reaction temperature of 70° C.

100 parts by weight of said pre-polymer comprising terminal isocyanate groups were mixed with 0.5 parts by weight of a phenolic antioxidant, 1 part by weight of dibutyl tindilaurate (reaction accelerator). Subsequently amounts of diisooctyl adipate (plasticizer) and toluol-moist mica powder were admixed with stirring, so that the pigment volume concentration (PVC) of mica was 10% and the content of free isocyanate groups from the converted toluylene diisocyanate was 1.0 wt. % of the total preparation. After two-months of storage at room temperature using the procedure of Example 1, the preparation had gelled.

The entire text of European Patent Application No. 92 106475.5 filed on Apr. 15, 1992, to which priority is claimed herein, is incorporated herein by reference.

The invention now being fully described, it will be apparent to one of ordinary skill in the art that many changes and modifications can be made thereto without departing from the spirit or scope of the invention as set forth herein.

What is claimed as novel in Letters Patent of the United States is:

1. An improved mineral-filled urethane pre-polymer-based surface coating, comprising free isocyanate groups, the improvement comprising
   (a) a thiophene of the chemical formula

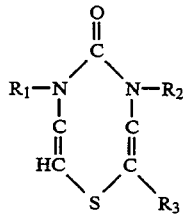

(I)

wherein $R_1$ and $R_2$ are independently ($C_1$-$C_8$)acyl; and $R_3$ is ($C_1$-$C_{12}$)acyl, ($C_1$-$C_8$)alkyl or ($C_6$-$C_{12}$)aryl substituted with hydrogen, halogen, $NO_2$, CN, alkoxy or carbonyloxyalkyl, said halogen, $NO_2$, CN, alkoxy and carbonyloxyalkyl substituent being non-reactive with components of the surface coating and (b) an arylsulphonylisocyanate of the chemical formula

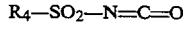

(II)

wherein $R_4$ is ($C_6$-$C_{12}$) aryl or ($C_6$-$C_{12}$)aryl substituted with at least one hydrogen, halogen, $NO_2$, alkoxy or carbonyloxyalkyl substituent, and wherein said aryl substituent is non-reactive with components of the surface coating.

2. The surface coating of claim 1, wherein the thiophene and the arylsulphonylisocyanate are present in amounts effective to prevent cross-linking or gelation of the coating.

3. The surface coating of claim 1, wherein $R_1$ and $R_2$ are acetyl.

4. The surface coating of claim 1, wherein $R_3$ is 4-ethoxycarbonylbutanoyl.

5. The surface coating of claim 1, wherein $R_3$ is ethyl.

6. The surface coating of claim 1, wherein the thiophene compound is 1,2-diacetyl-4-(4-ethoxy carbonylbutanoyl)-1H,3H-thieno[3,4-d]imidazol-2-one or 1,2-diacetyl-4-ethyl-1H,3H-thieno-[3,4d]imidazol-2-one.

7. The surface coating of claim 1, wherein $R_4$ is phenyl, naphthyl, or phenyl or naphthyl, substituted with hydrogen, halogen, $(C_1-C_8)$alkyl or $(C_1-C_8)$alkoxy, said hydrogen, halogen, $(C_1-C_8)$ alkyl or $(C_1-C_8)$ alkoxy substituent being non-reactive with components of the surface coating.

8. The surface coating of claim 1, wherein $R_4$ a cumyl group.

9. The surface coating of claim 1, wherein $R_4$ is a toluyl group.

10. The surface coating of claim 1, wherein the mineral comprises a silicate.

11. The surface coating of claim 10, wherein the silicate comprises a member selected from the group consisting of kaoline, talcum and mica.

12. The surface coating of claim 10, wherein the silicate compound has the chemical formula

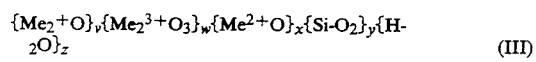

(III)

wherein Me is a cation of a valency indicated by the charge; v is about 0.1 to 1; w is about 0.2 to 5; x is about 0.1 to 8; y is about 10 to 11; and z is about 2 to 8.

13. The surface coating of claim 2, wherein the thiophene compound is present in an amount of about 0.01 to wt. 1.0% of the pre-polymer.

14. The surface coating of claim 13, wherein the thiophene compound is present in an amount of about 0.1 to 0.5 wt. % of the pre-polymer.

15. The surface coating of claim 2, wherein the arylsulphonyl monoisocyanate is present in an amount of about 0.01 to 1.0 wt. % of the pre-polymer.

16. The surface coating of claim 15, wherein the aryl sulphonylic monoisocyanate is present in an amount of about 0.1 to 0.5 wt. % pre-polymer.

17. The surface coating of claim 1, wherein the urethane pre-polymer comprises terminal isocyanate groups in an amount of 0.2 to 1.4% by weight of the total preparation.

18. The surface coating of claim 1, wherein
the urethane pre-polymer comprises a reaction product of a polyester, polyether, polybutadiene, polyol or mixtures thereof with a diisocyanate of the chemical formula

(IV).

19. The surface coating of claim 1, further comprising anti-oxidants;

reaction acceleration;

plasticizers; or flame-proof retarding agents.

20. A method of preventing the cross-linking or gelation of a urethane pre-polymer surface coating comprising a mineral filler, the method comprising adding to a urethane pre-polymer coating (a) a thiophene compound of the chemical formula

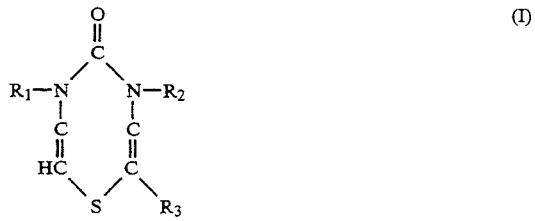

(I)

wherein $R_1$ and $R_2$ are independently $(C_1-C_8)$acyl; and $R_3$ is $(C_1-C_{12})$acyl, $(C_1-C_8)$alkyl or $(C_6-C_{12})$aryl substituted with hydrogen, halogen, $NO_2$, CN, alkoxy or carbonyloxyalkyl, said aryl substituent being non-reactive with components of the surface coating; and (b) an arylsulphonylisocyanate compound of the chemical formula

(II)

wherein $R_4$ is $(C_6-C_{12})$aryl or $(C_6-C_{12})$aryl substituted with at least one hydrogen, halogen, alkyl or alkoxy, wherein the aryl substituent is non-reactive with components of the surface coating, in amounts effective to prevent or delay cross-linking or gelation of the surface coating.

* * * * *